Oct. 30, 1951 L. E. CLARK 2,573,405

CINEMATOGRAPHIC LIGHT CONTROL APPARATUS

Filed Feb. 5, 1949 3 Sheets-Sheet 1

Inventor
Lauriston E. Clark
by Roberts, Cushman & Grover
Att'ys.

CINEMATOGRAPHIC LIGHT CONTROL APPARATUS

Filed Feb. 5, 1949 3 Sheets-Sheet 2

Inventor
Lauriston E. Clark
by Roberts, Cushman & Grover
Att'ys.

Inventor
Lauriston E. Clark
by Roberts, Cushman & Grover
Att'ys.

Patented Oct. 30, 1951 2,573,405

UNITED STATES PATENT OFFICE 2,573,405

CINEMATOGRAPHIC LIGHT CONTROL APPARATUS

Lauriston E. Clark, Los Angeles, Calif., assignor to Technicolor Motion Picture Corporation, Los Angeles, Calif., a corporation of Maine Application February 5, 1949, Serial No. 74,727

23 Claims. (Cl. 315—292)

This invention relates to the art of controlling machines to perform a predetermined sequence of operations and particularly to mechanism controlled by a record carrying code signals such as the perforated card used in the Hollerith system of compiling accounting and statistical data. Intelligence is prepared on such types of records by operation of a recording machine which marks signals on the record in a sequence of coded groups. After preparation the record is read by an analyzing device which causes other machinery to perform a number of operations according to the sequence in which the coded groups are analyzed.

Usually the signals are marked in columns lengthwise of the record and disposed in coded groups transversely of the columns. However the succession of coded groups does not ordinarily occupy the whole field available on the record, each transverse group extending substantially across the entire width of the record. In controlling certain mechanisms it is desirable to record a larger number of code groups in the available field so that a maximum number of operations may be controlled by the record and the cooperative analyzing machines.

For example the art of cinematography involves printing a positive film strip from a negative which may carry over 150 different scenes, each one requiring a different exposure to produce an acceptable density in the positive print. For quantity production of prints it is desirable to predetermine the operation of the exposing light source so that the entire sequence of scenes may be printed without interruption.

One object of the present invention is to provide a way to increase the number of code groups which may be incorporated in a record of predetermined length. Another object is to provide apparatus for presetting a series of exposure intensities to be used in printing motion picture films which employs standard records prepared with available statistical recording machines, which is compact and simple in construction, efficient and easy to use, and economical to manufacture.

In one aspect the invention involves a record having columns of signal marks herein also shortly referred to as signals and comprises mechanism for advancing the record lengthwise of the columns to successive positions, a sensing element associated with each of the columns and responsive to a signal so as to affect an electric circuit, and means for changing the columns to which the sensing elements are responsive whereby different columns are effective at different times.

Preferably the effect of the columns is varied by selective switches or like means which render some of the sensing switch elements inoperative while other elements are operative. The selective means is provided so that the signals may be disposed in two or more coded groups transversely of the columns, thereby utilizing a greater portion of the record. Only one of the transverse groups is sensed at one time, the other group or groups being sensed at other times. Sequencing means may be provided to actuate the advancing mechanism in a series of steps and the changing means in a concomitant series of shifts; that is, the advancing mechanism and the selective means may be actuated alternately, or in each cycle of change the column changing means may be actuated once simultaneously with the advancing mechanism and once alone. The sequencing means may be controlled by the successive operations of a control switch actuated by external apparatus; for example, a microswitch may be closed and opened by the movement of a lever in response to a notch in a motion picture film strip moving past said switch.

In a further aspect the invention comprises the combination of a film strip carrying consecutive picture series requiring individual exposure intensities and cuing signals for each change of the intensity, with a control record having code signals arranged in groups transversely disposed in relation to the columns of signals, each group of code signals defining one of said exposure intensities and corresponding to one of the cuing signals. In this aspect two or more groups of code signals are disposed in one row transversely of the columns of signals.

In a still further aspect the invention comprises a control record having a series of consecutive groups of code signal elements, marks or indicia arranged in two or more adjacent columns so that the series passes back and forth between the columns as it progresses along the record. More particularly the pattern card has transverse rows of signal elements which are divided into two or more adjacent groups of signal elements. Each group of signals is one of a series of groups which progresses transversely of a row, thence to the next row, then transversely of the next row, and so on passing in a zig-zag fashion lengthwise of the card.

In another aspect the apparatus comprises the combination of a record having a plurality of coded signal groups, a carrier for the record, sensing elements in contact with the record, the carrier being movable from the starting position to associate successive groups of code signals with the sensing elements, a device for retracting the sensing elements from contact with the record, and a switch carried on the carrier adapted to actuate the retracting device when the carrier is moved toward the starting position.

For the purpose of illustration particular embodiments of the invention are illustrated in the accompanying drawings in which.

Figure 1:
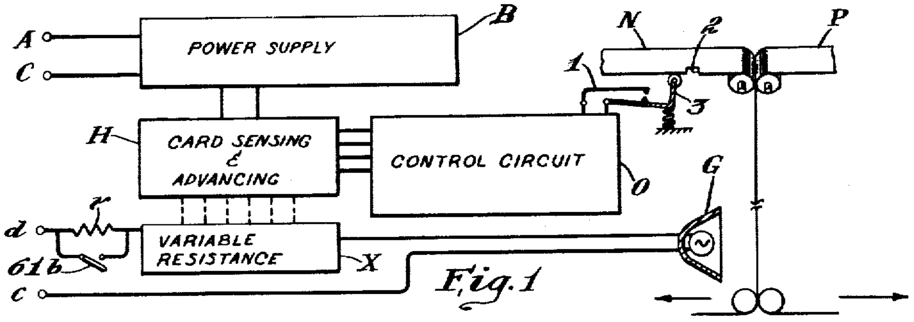
Fig. 1 is a block diagram of cinematographic light change apparatus.
Figure 8:
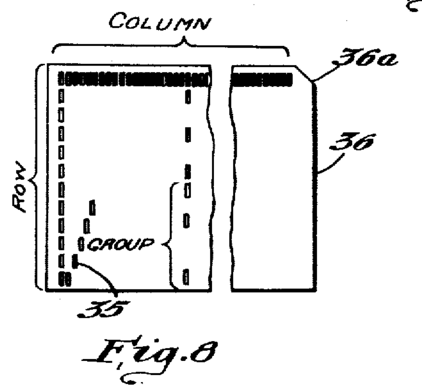
Fig. 8 is a plan view of a control card.

As shown in Fig. 1 the light change apparatus includes a switch 1, a control circuit O, mechanism H for sensing and advancing a card like that shown in Fig. 8, and a variable resistance X in series with a printing lamp G and a source of direct current power applied at the terminals *d* and *c*. A power supply B converts alternating current supplied at the terminals A and C to power at suitable voltages for the card sensing mechanism and the control circuit. A negative film strip N and a positive film strip P are fed past the switch 1 and the printing lamp G. A notch 2 in the negative film strip N actuates a lever 3 as it passes, thereby to operate the switch 1. Actuation of the switch 1 momentarily conditions a part of the control circuit; the control circuit then causes the card to be advanced one step and selects the coded group to which the card sensing mechanism will respond. In accordance with the coding of the particular groups sensed, the effect of the variable resistance X is selected so that the exposure of the printing lamp is set to expose properly the scene following the notch on the negative film strip N.

One type of coded card is shown in Fig. 8. On such a record it is possible to punch 960 perforations disposed in rows of 12 and columns of 80. Usually the detectors used to sense the perforations are disposed transversely of the card so that they sense all the holes punched in one row. If less than twelve circuits are to be controlled by the card each row may be broken up into two or more coded groups. Coding is accomplished by punching one or more perforations in one of the two groups within the rows. Each row of twelve perforations on the card shown in Fig. 8 is divided into two groups of six possible perforations each. Different codings are obtained by punching one perforation of a group in combination with one or more of the other perforations in the same group. According to the present invention, the two groups in the same row may be sensed successively rather than simultaneously. For this purpose the card is punched with a novel series of code groups which alternately progresses transversely and lengthwise of the card. As previously explained the card is divided into two columns of eighty code groups, each group being similar to that indicated by the bracket in Fig. 8. The series of code groups may begin in the lower column and in the extreme left-hand row of the card, and thence progress to the adjacent group in the upper column in the same row, thence to a group in the second row from the left in either the upper or lower column, thence transversely of the second row, and so on.

Figure 2:
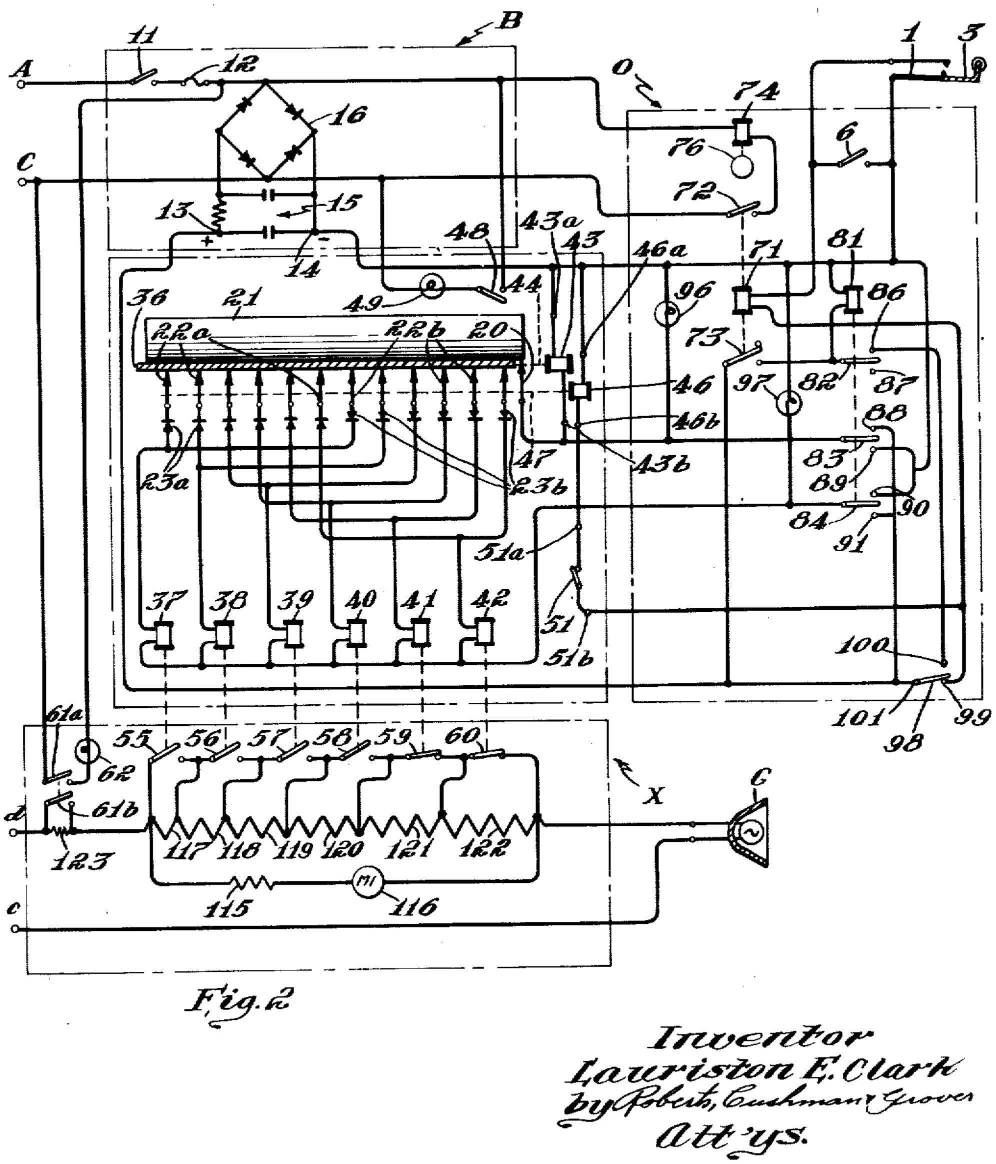
Fig. 2 is a schematic diagram of one embodiment of the apparatus.

A typical circuit with which such a card is used is shown in Fig. 2. A power supply B includes a power switch 11 and a fuse 12 in the line leading from the power terminal A. Across the lines leading from the terminals A and C is a bridge rectifier 16 which furnishes rectified current at the output terminals 13 and 14. Rectifiers such as copper oxide cells or vacuum tubes may be used in the bridge, or a conventional rectifier may be employed. The rectified current is supplied to the card sensing and advancing mechanism H and to the control circuit O.

The sensing and advancing mechanism H (Figs. 2 to 6) includes a cylinder 21, and 13 detectors such as retractable brushes 20, **22*a* and 22*b* mounted so as to bear upon the cylinder 21 and make an electrical contact therewith. The control card 36 is inserted between the cylinder 21 and the brushes 22*a* and 22*b* so that contact is not made unless through a perforation in the card. In series with each of the six brushes 22*a* is a cell rectifier 23*a* such as a copper oxide cell connected so that it allows direct current to flow only from the brush 22*a* to the cylinder 21. The cells 23*b* in series with six brushes 22*b* permit current flow only from the cylinder 21 to the brushes 22*b*. Thus, although one of the six brushes 22*a* and one of the brushes 22*b* simultaneously make contact with the cylinder 21, if the polarity of direct current applied to the cells and the conductor is such that current tends to flow from the cylinder 21, current will flow only through the brush 22*b*. When one of the brushes 22*a* or 22*b* makes such contact an electrical circuit is completed through one of the relays 37 to 42. Thus either set of brushes 22*a* or 22*b***, depending on the polarity of current flowing thereto, may energize the relays.

Figures 3, 4:
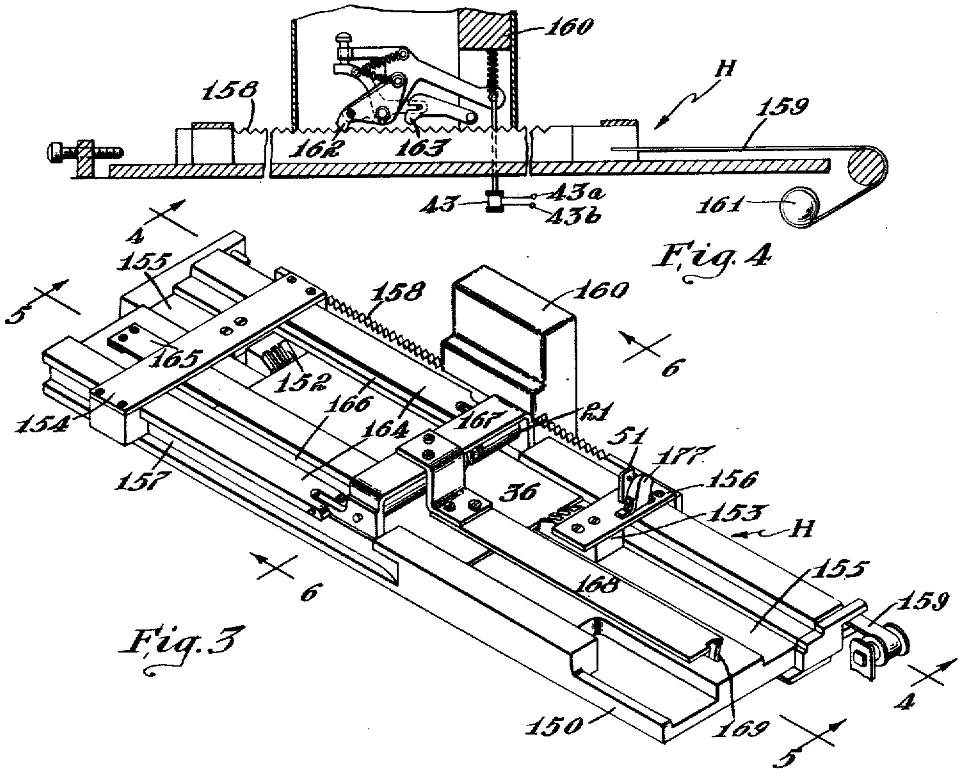
Fig. 3 is an isometric view of control card sensing and advancing mechanism.
Fig. 4 is a section on line 4—4 of Fig. 3.

A relay 43 is associated with advancing mechanism shown in Figs. 3 and 4 and indicated in Fig. 2 by the dotted line 44 which on actuation of the relay 43, advances the card lengthwise of the rows so that a new row of perforations is advanced to position opposite the brushes **22*a* and 22*b***.

The sensing and advancing mechanism, shown in detail in Figs. 3 to 6, includes a metal bed 150 on which the perforated card 36 lies between two moving guide blocks 152 and 153 constituting a record conveyor. The guide blocks are carried on yokes 154 and 156 respectively and ride in track 155 in the bed.

The ends of the yoke 154 ride in tracks 157 at each side of the bed while the yoke 156 rides in only one of the tracks 157. Both yokes are attached to and are moved by a rack 158 which is urged along the side of the bed by a ribbon 159 which is wound on a spring tensioned reel 161. Motion of the rack is controlled by escapement mechanism contained in the housing 160. As shown in Fig. 4, the escapement includes a pawl 162 normally engaging a tooth of the rack 158 and a pawl 163 which engages a tooth of the rack 158 by action of the relay 43 in response to a momentary current applied at its terminals **43*a* and 43*b*. As pawl 163 engages a tooth, pawl 162 is disengaged and lifted clear of a tooth. When the relay is deenergized, pawl 163 is disengaged from the rack, and pawl 162 engages an adjacent tooth allowing the rack to advance one step. The perforated card 36, urged by the blocks 152 and 153**, advances along the bed from a starting position remote from the brushes, bringing a new row of perforations adjacent the brushes. When the rack is urged toward starting position, the pawl 162 is cammed over the teeth with a ratchet action. The card is held evenly in the bed against the edge guides 164 and under the shoulder bars 166 attached to the edge guides and an elongate plate 165 which bears on the card, holding it flat against the bed.

The cylinder 21 is carried on a yoke 167 which is rotatably mounted on the edge guides 164. The yoke 167 may be swung upwardly to lift the roller away from the bed 150. Attached to the yoke is an elongate plate 168 which serves to hold the card against the bed, and engages at one end with the latch 169 securing the roller yoke 167. The latch controls a switch 98 having terminals 99, 100 and 101 as hereinafter explained.

Figure 5:
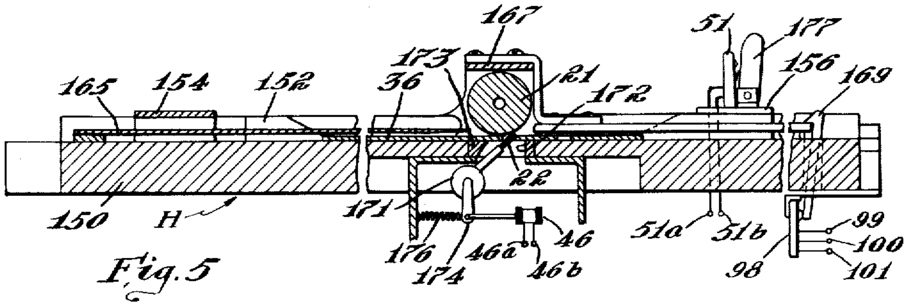
Fig. 5 is a section on line 5—5 of Fig. 3.
Figure 6:
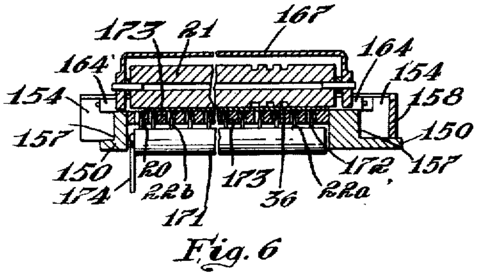
Fig. 6 is a section on line 6—6 of Fig. 3.

As shown in Figs. 5 and 6, the sensing brushes 20, 22*a* and 22*b* are mounted on a rotating support 171 and extend at an angle to the bed 150 through an aperture 172 in a plate 173 of insulating material fitted in the bed. The support 171 carries an arm 174 which is urged by a spring 176 to rotate the support and retract the brushes from contact with the roller 21 or the card 36. When relay 46 having terminals 46*a* and 46*b* is energized, the arm 174 is moved rotating the brush support 171 until the brushes touch the card or the roller. A normally closed switch 51, connected in series with the relay 46, is mounted on the yoke 153. A handle 177 is movably attached to the yoke 156. If the handle is pushed to return the card to starting position, it opens the switch 51, thereby deenergizing the relay 46 and retracting the brushes. Thus the brushes cannot be damaged by moving the card toward starting position.

The control circuit O shown in Fig. 2 includes a control relay 71 which is in series with the switch 1 actuated by the notch in the film. When the switch 1 closes, the control relay 71 is momentarily energized, closing two switches or keys 72 and 73. The switch 72 completes a circuit from the terminals A and C through a relay 74 which actuates a counter 76. Each notch passing the switch 1 is counted so that the total number of scenes on the negative strip N which have been exposed by the light change apparatus is indicated. An auxiliary switch 6 may be manually operated in place of the automatic actuation of the edge notch switch 1 to energize relay 71 and actuate the control circuit O.

The switch 73 operated by the control relay 71 closes a circuit through a sequencing relay 81 which controls the switches 82 to 84. The relay 81 is a latching relay which holds the switches 82, 83 and 84 in one of two positions, either against the contacts 86, 88 and 90 or against the contacts 87, 89 and 91 respectively.

The selective switches 83 and 84 serve to select the polarity of direct current through the card sensing mechanism. When the switches 83 and 84 are in position against contacts 88 and 90, the current flow will be from the negative terminal 14 of the rectifier 16 through the terminal 90 of switch 84, the relays 37 to 42, thence through the rectifying cells 23*a* and the brushes 22*a* only to the conductor 21, through the brush 20, the terminal 88 of switch 83 and thence to the positive terminal 13 of the rectifier 16. When the switches 83 and 84 make contact with the terminals 89 and 91, the rectified current will flow only through the cells 23*b* and the brushes 22*b* since the current flow between these two switches is reversed. When the switches 83 and 84 are in the first of the above-described positions current will also flow through the indicator lamp 96, and in the second described position the indicator lamp 97 will be lighted. Thus the lamps indicate which of the two sets of six brushes, 22*a* or 22*b* are effective, hence which of the two transverse groups of coded signals on the card are being sensed.

Each time the sequencing relay 81 is energized by the control relay 71, the sequencing relay causes the selective switches 83 and 84 to reverse the polarity of current through the brushes, while every other time the sequencing relay is energized, the card advancing relay 43 is energized. Thus the card is advanced every other time the selective switches shift control from one set of brushes to the other, so that both columns of code groups are sensed alternately as the card is stepped past the brushes.

In series with the rectifier bridge 16, the brush retracting relay 46, and the switch 51 is the switch 98 constituting an auxiliary key or switch associated with the plate 168 used to guide the card as it is fed past the cylinder 21. When the plate 168 is lifted from engagement with the latch 169, the latch transfers the switch 98 from terminal 99 to terminal 100, thereby deenergizing relays 71 and 46. Relay 71 is then unresponsive to a closing of the edge notch switch 1, and relay 46 allows the brushes to be retracted. In addition, if the latching relay should be conditioned so that switch 82 makes contact with terminal 86, current will be applied through terminal 100 of switch 98 to the relay 81, energizing it and causing the switch 82 to transfer to the unconnected terminal 87, thereby deenergizing the latching relay. Thus whenever the guide plate 168 is disengaged from the latch 169, the latching relay will remain in or be returned to a predetermined starting condition, with the contacts of the switches 82, 83 and 84 making contact with terminals 87, 89 and 91 respectively.

According to the present invention, as the advancing and sensing mechanism is controlled by the circuit O relays 37 to 42 are energized or deenergized in response to a sensing by the brushes of perforations in the card. The relays in turn change the condition of a group of switches 55 to 60 so that they either do not affect or on the other hand short circuit one or more of the resistors 117 to 122. Thus if switches 83 and 84 will permit current to flow through the brushes 22*a* when one of the brushes, for instance, the extreme left brush 22*a*, senses a perforation in the card, current will flow through the relay 37, causing switch 55 to close and short out the resistance 117, thus decreasing the voltage drop across the resistor bank 117 to 122. The voltage applied to the lamp G and the intensity of its exposure is increased. Direct current power for the lamp is applied at the terminals *d* and *c*. In order that not all the resistances be effective in the absence of any perforations opposite the brushes two of the switches 59 and 60 are controlled by a switch action opposite to that of the other switches and normally, that is, in the absence of a signal, they are closed, shunting the resistors 121 and 124 respectively. With this arrangement the value of the resistance bank and hence the intensity of the printing lamp does not jump to an extreme value while the control card is being advanced and the brushes 22*a* and 22*b* wipe over the unperforated portion of the card between the rows of perforations. Thus, if under the foregoing conditions the brush adjacent the extreme right hand brush were to sense a perforation allowing current to flow through the relay 42, the switch 60 would open, allowing the resistance 122 to be effective in the series bank. An auxiliary resistor 123 in series with the resistor bank and of less value than any of the resistors therein may be rendered effective manually by the switch 61b so as to cause minor corrective changes in the effect of the resistors in the bank. For instance, if it is desired to obtain a resistance value intermediate two values of the bank resistors the switch 61b is opened manually throwing the resistor 123 in series with the resistance bank. Switch 61a is physically connected to switch 61b. When the resistance 123 is shorted out of this circuit the switch 61a connects a lamp 62 across the power lines A and C, indicating that the resistance 123 is not in series with the bank. In parallel with the resistor bank is a meter 116 which measures the voltage drop across the resistance bank and is graduated in values of intensity. These values correspond to the intensity of the lamp G as determined by the voltage drop across the resistors which are not shunted by one of the switches 55 to 60.

The values of the resistors in the bank are chosen so that one or more of the individual values will be a multiple of some unitary value. For instance the series employed with six resistors would be 1*n*, 2*n*, 4*n*, 8*n*, 16*n* and 32*n*. Various combinations of these values will yield a sum equal to any value between 1*n* and 63*n*.

Figure 7:
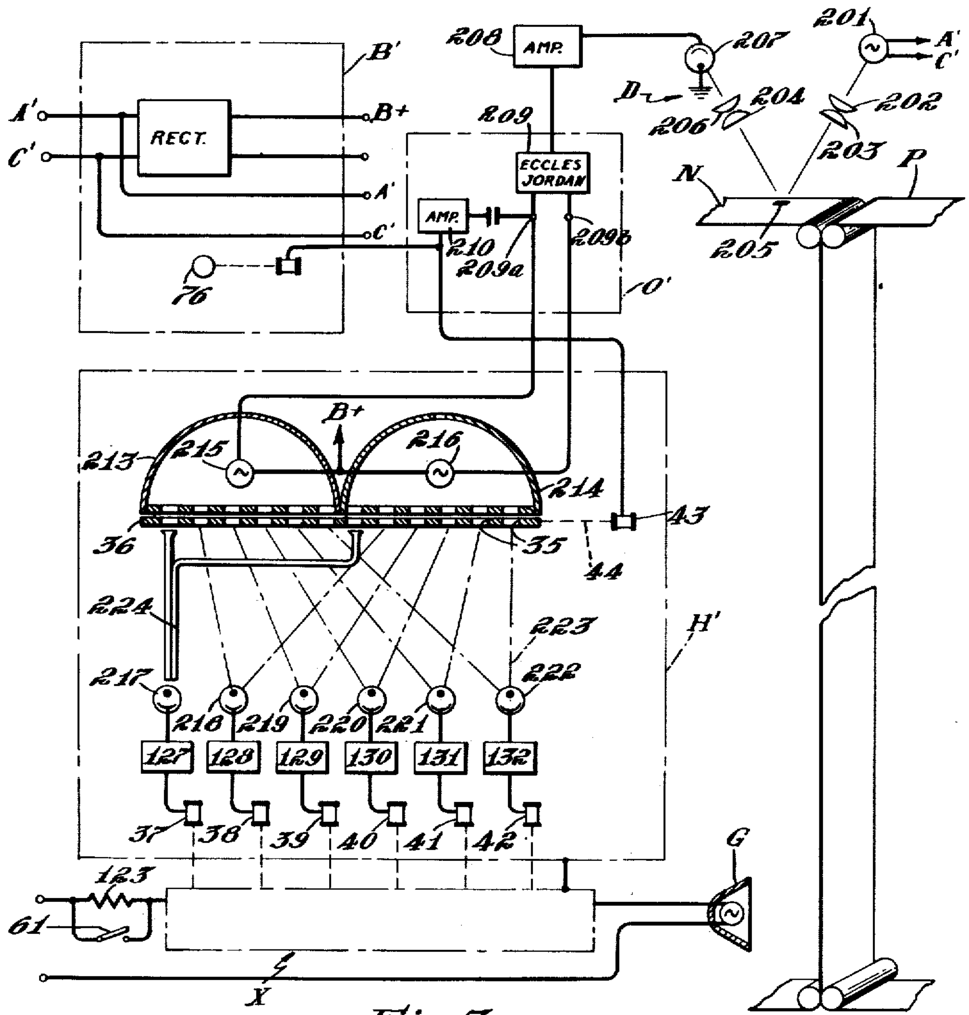
Fig. 7 is a schematic diagram of another embodiment of the invention.

In the embodiment illustrated in Fig. 7 the light change apparatus comprises a photoelectric system D for detecting a mark placed on the negative film strip N, an electronic control circuit O' and a photoelectric system H' for detecting perforations in a card. A power supply B', to which alternating current is supplied at the terminals A'—C', provides the various potentials required to operate the electronic circuits. The photoelectric system used to sense perforations in the card controls relays which actuate resistor switches associated with the variable resistance bank X like that in Fig. 1. The first photoelectric system D' comprises an exciter lamp 201, condensing lenses 202, 203, 204 and 206, and the photoelectric cell 207. Light from the lamp 201 is focused by the lenses 202 to 203 on a spot 205 of paint or any material contrasting with the negative strip N. Light reflected from the spot 205 is focused by the lenses 204 and 206 on the cathode of photoelectric cell 207. The passing of the spot 205 through this system will produce a momentary pulse of current through the photoelectric tube 207 which is amplified in the circuit 208 and applied to the control circuit O'. Various details of this system are disclosed in a paper by Irwin A. Moon entitled "A Photoelectric Film Cuing System" published in the Journal of the Society of Motion Picture Engineers, vol. 49, No. 4, October 1947.

The card sensing mechanism H' includes the photoelectric tube exciter lamps 215 and 216, the photoelectric tubes 217 and 222, the amplifiers 127 to 132 each associated with a photocell, the relays 37 to 42, which control switches in the resistor bank X which may be the same as the resistor bank in the embodiment shown in Fig. 2.

The amplified pulse output of amplifier 208 is applied to the input of an Eccles-Jordan electron tube circuit 209. Such a circuit includes two tubes held in a stable condition in which one or the other of them is conducting current. An electric pulse applied to the input of such a circuit causes the tube then conducting to cease conducting and allow the other to conduct. A lamp 215, or 216, suitable for exciting a photoelectric cell, is connected in series with each of the plates of the two tubes and the source of the plate voltage at the terminals 209*a* and 209*b*. Only the lamp in series with the conducting tube will be lighted. As one of the tubes changes from a conducting to a non-conducting state there will be a rise of voltage at terminal 209*a*. This voltage change is coupled to the grid of an amplifier tube 210 whose output will be a pulse of increased voltage.

Depending on which half of the Eccles-Jordan circuit 209 is conducting, one of the indicator lamps 215 or 216 within the shields 213 and 214 will project light through the perforations 35 of the card 36. On the side of the card opposite the exciter lamps an optical system indicated by the paths 223 directs the rays from the exciting lamp on the cathodes of the phototubes 117 to 122. The optical paths 223 are tubes 224 of a synthetic transparent material, such as that sold under the trade name Lucite, which have the property of conducting light rays around corners so that light rays entering one end of the tube pass out the other end. These tubes direct a light ray passing through a perforation in the card 36 so that it falls on the cathode of the corresponding phototube. An optical path of mirrors, lenses or prisms would also be suitable.

The embodiment shown in Fig. 7 operates as follows. As the negative film strip is fed past the photoelectric detecting system D' the phototube 207 responds to a spot on the film thereby causing the Eccles-Jordan circuit 209 to change its terminus condition. As a result the terminals 209*a* and 209*b* alternately will supply current. As the conducting state shifts current from terminal 209*a* and 209*b* a momentary pulse of current is applied to the amplifier 210 which causes the relay 43 to advance the card 36 one step to a new position. Simultaneously the lamp 216 which has been lighted is extinguished and the lamp 215 is lighted. Perforations on the right-hand side of the card are then sensed by means of the light projected from the lamp 216 onto the cathodes of the phototubes 217 to 222 which correspond to perforations in the card. While light is projected on their cathodes the phototubes will conduct, causing the voltage at their plates to drop in value. This voltage drop is applied to the grids of a power amplifier which is normally conducting, causing it to cease conducting and deenergize one of the relays 37 to 42. Deenergization of the relay causes a transfer to the contacts of the switches 117 to 122 in the same manner that that transfer is effected in the embodiment in Fig. 2, thereby selecting the light intensity of the printing lamp G according to the code on the record 36.

Figure 9:
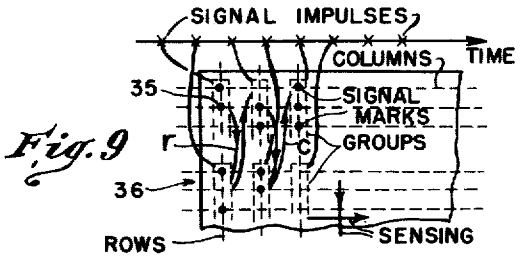
Fig. 9 is a diagram illustrating the operation of the system according to the invention.

Recapitulating, with reference to Figs. 8 and 9, the operation of the system exemplified in the above described embodiments, it will now be evident that the record such as card 36 carries signal marks such as groups of punched perforations 35 representing a succession of differentiated signals to be initiated by these groups, such as various combinations of current flows energizing relays 37 to 42. The marks are arranged in a plurality of adjacent columns and in rows transverse of the columns. Each row includes a plurality of mark groups of varying configurations with each group defining one of the signals. The sequence of groups progresses, in the intended order of succession of the signals, within each row as indicated by arrows *r* and from there to the next row as indicated by arrows *c*. The groups of marks are sensed in this sequence by means of apparatus including cuing provisions such as described with reference to Figs. 2 and 7, along each row and from the end of the row to the beginning of the next row, to produce the intended series of differentiated signals in predetermined succession. Due to the correlation of detectors such as brushes 22 and signal responsive means such as switches 55 to 60, the lamp G is not over or under supplied during movement of the record from column to column, thus securing continuity of operation.

It should be understood that the present disclosure is for the purpose of illustration only and that this invention includes all modifications and equivalents which fall within the scope of the appended claims.

I claim:

1. In the art of controlling mechanism with a record having a plurality of columns of code marks, apparatus comprising a conveyor for advancing the record lengthwise of the columns to successive positions along a predetermined path, a plurality of detectors disposed adjacent said path to respond to said marks, a selecting switch operative to render certain of the detectors only operative while the record is in each of said positions so that different columns are effective at different times, and a sequencing switch operative to actuate said conveyor and said selecting switch concomitantly.

2. In the art of controlling mechanism with a record having a plurality of columns of code marks, apparatus comprising a conveyor for intermittently advancing the record lengthwise of the columns to successive positions along a predetermined path, a plurality of detectors disposed adjacent said path to respond to said marks, and a selecting switch operative to render certain of the detectors operative while the record is in each of said positions, so that different columns are effective at different times.

3. In the art of controlling mechanism with a record having a plurality of columns of code marks, apparatus comprising a conveyor for advancing the record lengthwise of the columns to successive positions along a predetermined path, a plurality of detectors disposed adjacent said path to respond to said marks, a selecting switch operative to render certain of the detectors only operative while the record is in each of said positions so that different columns are effective at different times, a control switch having a series of operations, and a sequencing switch transferred intermittently by said control switch to actuate said conveyor and selecting switch concomitantly in response to successive operations of the control switch.

4. In the art of controlling mechanism with a record having a plurality of columns of code marks and with a source of cuing signals, apparatus comprising a conveyor for intermittently advancing the record lengthwise of the columns to successive positions along a predetermined path, a plurality of detectors disposed adjacent said path to respond to said code marks, a selecting switch operative to render certain of the detectors only operative while the record is in each of said positions so that different columns are effective at different times, a control switch responsive to said cuing signals and having a series of operations, and a sequencing switch transferred intermittently by said control switch to actuate said conveyor and selecting switch concomitantly in response to successive operations of the control switch.

5. For controlling a series of consecutively varying physical values a control record having a series of consecutive groups of code marks arranged in a plurality of adjacent columns, the series progressing back and forth between columns.

6. In the art of controlling mechanism with a record having a plurality of coded groups, apparatus comprising a plurality of brushes for detecting the groups movable between an operative position in which they touch the record and an inoperative position, an electromagnet operating to move the brushes between operative and inoperative position, a conveyor movable from a starting position for advancing the record to associate successive groups with the brushes, and a switch disposed on said conveyor conditioned by manual force causing movement of said conveyor toward starting position to actuate said electromagnet to retract the brushes from operative position.

7. In the art of controlling mechanism with a record having a plurality of columns of code marks, apparatus comprising a conveyor for advancing the record lengthwise of the columns to successive positions along a predetermined path, a plurality of detectors disposed adjacent said path to respond to said marks, a selecting switch operative to change the columns to which the detectors are responsive so that different columns control at different times, a latch operated when the record is removed from the apparatus, and an auxiliary switch conditioned by the latch to transfer the selecting switch in one direction only thereby to shift control to a predetermined column.

8. In the art of controlling mechanism with a record having a plurality of columns of marks, apparatus comprising a latch operated when a record is removed from the apparatus a conveyor for intermittently advancing the record lengthwise of the columns, a plurality of detectors disposed adjacent said record to respond to said marks, a selecting switch having a starting position in which certain of the detectors are rendered operative and a second position in which other detectors are operative, an electromagnet having two conditions for transferring the contact means between said positions, a control key for momentarily energizing an electromagnet, and a circuit in parallel with said control key including, said circuit an auxiliary key conditioned by said latch means to close the circuit and a two-position contact operated by an electromagnet, said contactor having a non-conducting position corresponding to said starting position, whereby, if an electromagnet is energized through the auxiliary key and the contactor, the condition of said electromagnet is changed to transfer the contactor to non-conducting position, and the selecting switch to starting position, so that certain of the detectors are operative when a record is placed in the apparatus.

9. In the art of controlling a continuous operation with a pattern card having a plurality of columns of circuit effecting code marks disposed in two groups, with the columns of each group being offset transversely of the other columns, apparatus comprising a conveyor for intermittently advancing the record to successive positions along a predetermined path extending lengthwise of the columns, a set of detectors for each group of marks, a set of control circuits respectively for each set of detectors, in each circuit a rectifier for passing current of one polarity, the polarity for the two sets of control circuits being opposite, and a polarity reversing switch for applying current of either polarity to all of said circuits so that different groups of detectors and marks are effective at different times, whereby the marks of first one and then the other of said groups may be sensed in each of said positions.

10. For controlling a series of consecutively varying physical values a control record having a series of consecutive groups of code marks arranged in a plurality of adjacent columns and in rows disposed transversely of the columns, the series progressing alternately from column to column and from row to row.

11. For controlling a series of consecutively varying physical values a control record having a series of consecutive groups of code marks arranged in a plurality of adjacent columns and in rows transversely of the columns, the series progressing transversely of a row through each group in a row and thence lengthwise of the columns to an adjacent row.

12. In apparatus for controlling exposure through a motion picture film with a control record, the combination of a plurality of resistors for varying an exposing light, and a switch for each resistor controlled by said record to determine the effect of a resistor, at least one of said switches being normally operative and another being normally inoperative to render a resistor effective in the absence of control by said record, whereby not all of the resistors are rendered effective in the absence of said control.

13. Apparatus for controlling a continuous operation comprising a primary record having columns of code marks, said marks being disposed in rows extending transversely of said columns, each row comprising at least two groups of code marks, a secondary record carrying cuing marks, a plurality of sets of detectors responsive to said marks, each set separately controlling said operation, a stepping conveyor acting lengthwise of the columns for associating the detectors with successive rows, a selecting switch operative successively to render each set of detectors operative while the detectors are associated with one row so that different code groups of a row are effective at different times, a control switch responsive to said cuing marks, means for feeding the secondary record to bring the cuing marks into operative relation with the control switch, and a sequencing switch conditioned by the control switch to actuate said selecting switch and said conveyor concomitantly, thereby to control said operation according to successive coded groups sensed by the detectors at intervals timed by said secondary record.

14. In the art of controlling mechanism with a record having a plurality of columns of code marks, apparatus comprising a conveyor for advancing the record lengthwise of the columns to successive positions along a predetermined path of record and columns, a plurality of detectors disposed to respond to said marks, and a selecting switch operative to change the columns to which said detectors are responsive, so that different columns are effective at different times.

15. In the art of controlling a continuous operation with a record having a plurality of parallel columns of code marks, apparatus comprising a conveyor for intermittently advancing the record lengthwise of the columns to successive positions along predetermined paths of the columns, a plurality of circuits for controlling said operations, a plurality of sensing brushes in each of said circuits responsive to said marks, each sensing brush disposed adjacent the path of a column, and a selecting switch transferable to successively render each sensing brush in a circuit operative while the record remains in each of said positions, so that different columns are effective at different times.

16. In the art of controlling a continuous operation with a record having a plurality of parallel columns of code marks, apparatus comprising a conveyor for advancing the record lengthwise of the columns to successive positions along predetermined paths of the columns, a plurality of detectors responsive to said marks, a selecting switch operative to change the column to which said detectors are responsive so that different columns are effective at different times while the record remains in each of said positions, and a sequencing switch operable to actuate said conveyor and said selecting switch concomitantly.

17. In the art of controlling a continuous operation with a record having a plurality of parallel columns of code marks, apparatus comprising an electrically actuated conveyor for advancing the record lengthwise of the columns to successive positions along predetermined paths of the columns, a plurality of sensing brushes responsive to said marks and disposed adjacent the paths of respective columns, a selecting relay for successively rendering different sensing brushes operative while the record remains in each of said positions so that different columns are effective at different times, and a sequencing switch for concomitantly energizing said conveyor and said selecting relay.

18. In the art of controlling a continuous operation with a record having a plurality of parallel columns of code marks, apparatus comprising a conveyor for advancing the record lengthwise of the columns to successive positions along predetermined paths of the columns, a plurality of detectors responsive to said marks, a selecting switch operative to change the columns to which said detectors are responsive so that different columns are effective at different times while the record remains in each of said positions, a control switch responsive to said controlled operation for supplying a series of cuing signals, and a sequencing switch transferred intermittently by said control switch concomitantly to actuate said advancing means and said selecting means in response to successive cuing signals as supplied by the control switch.

19. In the art of electrically controlling a series of consecutive operations with a record having a plurality of parallel columns of code marks for initiating control currents and with a source furnishing cuing signals for cuing said control currents, apparatus comprising a conveyor for intermittently advancing the record lengthwise of the columns to successive positions along predetermined paths of the columns, a plurality of detectors responsive to said marks and disposed adjacent the paths of respective columns, a selecting switch for successively rendering different detectors operative while the record is in correspondingly different ones of said positions so that different columns are effective at different times, and a control switch responsive to said cuing signals concomitantly to actuate said conveyor and said selecting switch on successive operations of the control switch.

20. Apparatus for controlling a continuous operation involving intensity changes such as exposure through a motion picture film with varying exposure light intensity under control of a record having code marks disposed as groups in spaced rows transversely of the record, each group defining a given intensity, comprising elements for sensing the marks; a conveyor for advancing the record lengthwise successively to bring each row of marks into operative relation to said sensing elements; and, for effecting each intensity change corresponding to change from a group to the next, a switch responsive to a respective sensing element, said switches and sensing elements being interrelated such that one of said switches is normally operative and another is normally inoperative in the absence of a mark to be sensed by the sensing elements corresponding to said switches; whereby continuity of the operation is secured while the record is advancing without sensing of marks.

21. A record for initiating a succession of differentiated signals, comprising carrier means and thereupon code marks arranged on a plurality of adjacent columns and in rows transverse of said columns, each row including a plurality of groups of said marks with each group defining by its configuration one of said signals, and the sequence of groups as corresponding to said succession of signals progressing alternately within each row and from there to the next row.

22. A record for initiating a succession of differentiated signals, comprising a carrier sheet having marks aligned on a plurality of adjacent columns and also in rows transverse of said columns, each row having at least two groups of said marks with each group defining by its configuration a signal and each group embracing several columns, the sequence of groups as corresponding to said succession of signals progressing from the first to the last group of each row, from said last group to the first group of the next row, and so on.

23. The method of producing a succession of differentiated signals in predetermined order, which comprises the step of impressing a record carrier with marks arranged on a plurality of adjacent columns and in rows transverse of said columns, each row including a plurality of groups of said marks with the configuration of each group defining a respectively differentiated signal impulse and with the sequence of groups progressing in said order of said succession of signals within each row and from there to the next row, and the step of sensing said groups of marks along each row and from the end of said row to the beginning of the next row, thereby to produce a series of signals in said predetermined succession.

LAURISTON E. CLARK.

REFERENCES CITED

The following references are of record in the file of this patent:

UNITED STATES PATENTS

| Number | Name | Date |
|---|---|---|
| 2,440,906 | Metzger | May 4, 1948 |

FOREIGN PATENTS

| Number | Country | Date |
|---|---|---|
| 364,869 | Great Britain | Jan. 14, 1932 |

Certificate of Correction

Patent No. 2,573,405 October 30, 1951.

LAURISTON E. CLARK

It is hereby certified that error appears in the printed specification of the above numbered patent requiring correction as follows:

Column 10, line 56, strike out "including" and insert the same after "said circuit", same line;

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*